Dec. 8, 1931.    W. LOWERY    1,835,166
CHUCK FOR AXLE TURNING LATHES
Filed March 5, 1928    2 Sheets-Sheet 1
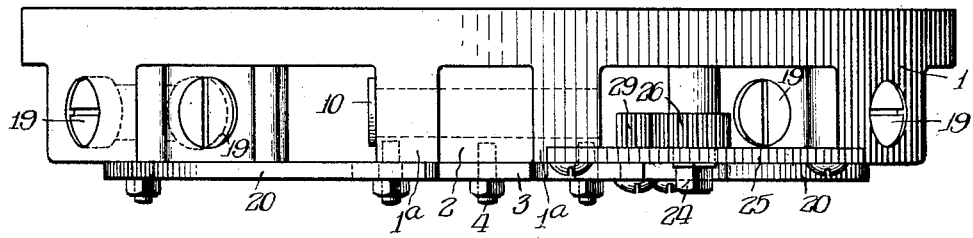
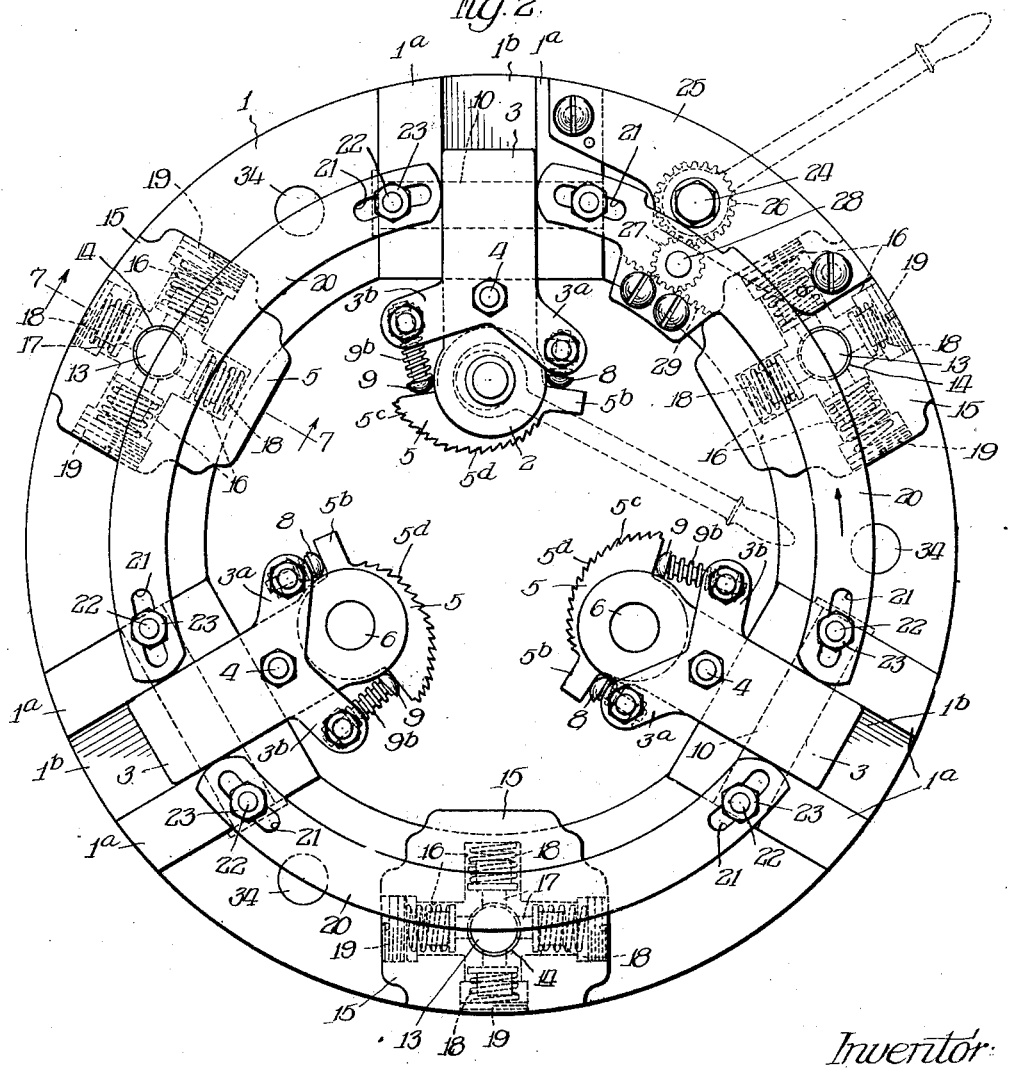
Inventor
William Lowery,
By [signature] Attys.

Dec. 8, 1931.  W. LOWERY  1,835,166
CHUCK FOR AXLE TURNING LATHES
Filed March 5, 1928  2 Sheets-Sheet 2
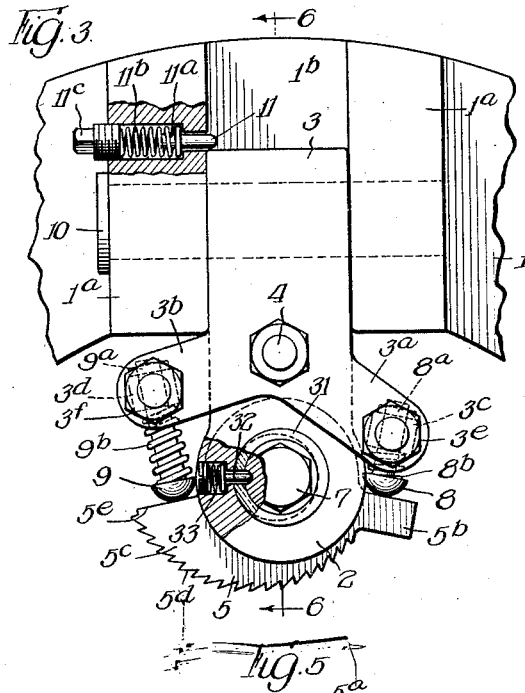
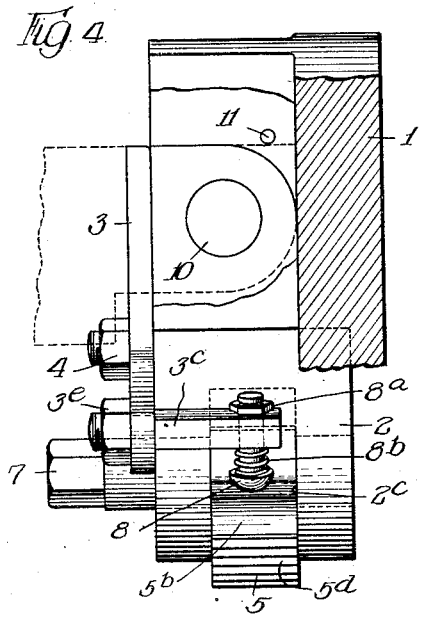
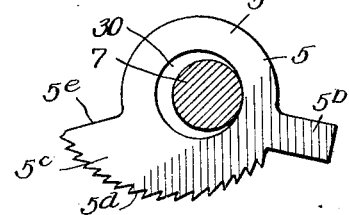
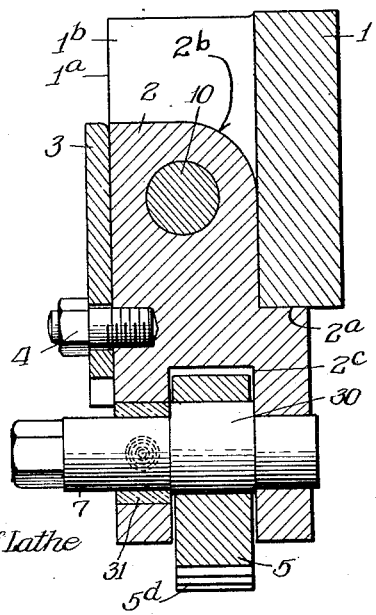
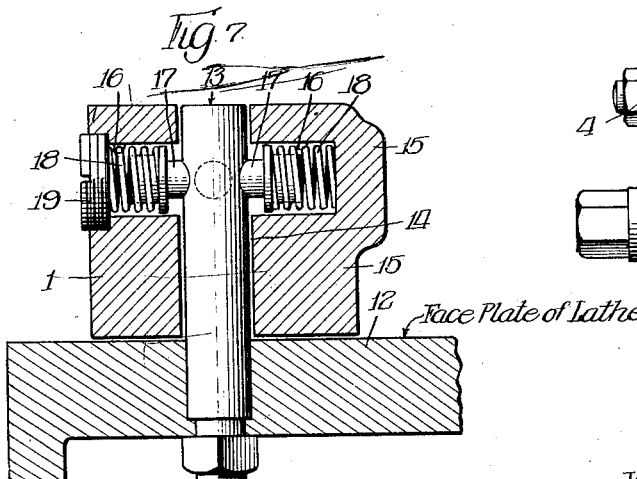
Inventor:
William Lowery,
By [signature] Attys.

Patented Dec. 8, 1931

1,835,166

UNITED STATES PATENT OFFICE

WILLIAM LOWERY, OF HAMMOND, INDIANA, ASSIGNOR, BY MESNE ASSIGNMENTS, TO PITTSBURGH SCREW & BOLT CORPORATION, OF PITTSBURGH, PENNSYLVANIA, A CORPORATION OF PENNSYLVANIA

CHUCK FOR AXLE-TURNING LATHES

Application filed March 5, 1928. Serial No. 259,161.

The present invention has to do with lathes for turning car axles, and is more particularly concerned with the chucks thereof.

Its primary object is to provide a lathe chuck of this character by means of which the centering of the axle, when the latter is introduced to the lathe, may be expeditiously effected, and also which will compensate for irregularities in the axle blank so as to insure correct position of the same for action thereon by the cutting tools.

A further object of the invention is the provision of a chuck of the character mentioned which includes in its construction readily operable means for quickly locking the axle in engagement with the chuck, and for releasing the same at the completion of the work.

The invention also contemplates a lathe chuck having provision for quick disengagement of the clutch members to release the same from the axle in the event of the jamming or binding of the axle in relation to these members.

Other objects and advantages of the improvements will appear as the nature of the same is better understood, the invention consisting substantially in the novel construction, combination and arrangement of parts hereinafter fully described, illustrated in the accompanying drawings, and finally pointed out in the appended claims.

The form of the invention made the basis of the present disclosure is believed at this time to be a preferred embodiment thereof, but it is susceptible to change, modification and variation, and is to be taken, therefore, merely as an illustration of a practical expression of the invention.

In the drawings

Fig. 1 is a top plan view of a chuck embodying the features of the present invention;

Fig. 2 is a face elevation thereof;

Fig. 3 is a similar view, on an enlarged scale, of one of the clutch members and the related portion of the chuck body, part of the latter being shown in section;

Fig. 4 is an edge elevation of the clutch member illustrated in Fig. 3, parts also being shown in section;

Fig. 5 is a detail elevation of one of the clutch pawls;

Fig. 6 is a detail sectional view on the line 6—6, Fig. 3;

Fig. 7 is a similar view through one of the connections by which the chuck is mounted on the face plate of the lathe, as on the line 7—7, Fig. 2.

Referring now in detail to the accompanying drawings, the numeral 1 designates the body of the chuck. This is the form of an annulus, or ring-shape. At one face of said body 1, and arranged at spaced intervals about that face, is a series of outwardly-projecting ribs 1a, which ribs are arranged in pairs sufficiently spaced apart to provide a pocket or recess 1b. Preferably, there are three of these pockets or recesses, and pivotally mounted in each of the same is a laterally swinging clutch member 2. Each of these clutch members, at its rear face, is cut away to provide a shoulder 2a, said shoulder seating against the under edge of the chuck body 1 in order to provide a firm anchorage for the clutch members 2 when they are in position for engagement with the axle which is to be turned. This position of the clutch members is illustrated in Fig. 4.

The upper end of each of the clutch members 2, at the rear face thereof, also is cut away on a curved line, as at 2b, so as to facilitate movement of the clutch members when they are swung to open position, as illustrated in dotted lines in Fig. 4, or to that position which the members occupy when an axle is being introduced to the chuck.

Mounted at the outer face of each of the clutch members 2 is an actuator plate 3, each of said plates being pivotally mounted on its clutch member 2 by a threaded stud seated in the clutch member and provided with a locking nut. The stud and nut are designated by the numeral 4. The mounting of the actuator plates 3 on their respective studs is sufficiently loose to permit the plates to be swung upon the studs as fulcrum points, and thus to permit the plates to swing across the ribs 1a, in a manner to be hereinafter described. Each of the actuator plates 3 is provided with divergent supporting arms 3a and 3b, the arms 3a being slightly longer than the arms 3b. Each of the arms 3a carries a supporting post 3c, while each of the arms 3b carries a similar post 3d. The posts 3c and 3d extent at right angles to the arms 3a and 3b, and project from the rear faces of the actuator plates 3 to a point substantially midway the thickness of the clutch members 2. The ends of the posts 3c and 3d which pass through the plates 3 are screw-threaded to receive locking nuts 3e and 3f, respectively. The nuts 3e and 3f hold the supporting posts firmly in position, the bodies of the latter being substantially square in cross section, and thereby providing shoulders which contact the inner faces of the plates 3 in order to bind against these plates.

Each of the clutch members 2, at its inner end when the clutch members are considered from the position which they occupy when in clutching relation to the axle, or in the positions shown by full lines in Fig. 4, in Fig. 6, and likewise as illustrated in Fig. 2, is provided with a bifurcation or recess 2c. In each of the recesses 2c is mounted a clutch pawl 5. Each of these pawls includes a substantially semi-circular body 5a from which extends a laterally-projecting finger 5b, and also a segmental lip 5c, which constitutes the pawl proper. The lip 5c is disposed in eccentric relation to the body 5a, and the same is provided with a plurality of serrations or teeth 5d, whereby each of the locking pawls is adapted to firmly grip the axle to be turned when the axle is introduced to the chuck. The segmental lip 5c is of sufficient length to extend from the finger 5b to a substantial distance about the body 5a, and terminates in a shoulder 5e. In two of the clutch members 2, the respective clutch pawls 5 are pivotally mounted by pins 6, while in the third clutch member the pivotal mounting is effected by a cam key 7.

Slidably mounted in each of the posts 3c is a cushioning buffer 8. Each of these buffers includes an elongated shank which terminates in a contact head, the shank of the buffer passing through the supporting post 3c and having a holding nut 8a mounted upon the extremity of the shank. Interposed between the head of the buffer and the post 3c is a coil spring 8b, one end of which seats against the head of the buffer, while the other end seats against said post 3c. The head of the buffer also seats against the finger 5b of the adjacent clutch pawl 5, the spring 8b serving as a cushion between the pawl and the post 3c, and thus affording yielding movement of the pawl under stress of the spring 8b.

A similar cushioning buffer 9 is slidably mounted in each of the posts 3d. Each of these buffers also includes an elongated shank which terminates in a contact head, the shank of the buffer passing through the supporting post 3d and having a holding nut 9a mounted on the extremity of the shank. Interposed between the head of the buffer 9 and the post 3d is a coil spring 9b, one end of which seats against the head of the buffer, while the other end seats against said post 3d. The head of the buffer 9 also seats against the shoulder 5e of the adjacent clutch pawl 5, the spring 9b serving as a cushion between the pawl and the post 3d, and thus affording yielding movement of the pawl under stress of the spring 9b.

The buffer 9 is longer than the buffer 8, and the spring 9b is longer, and therefore of greater strength, than the spring 8b. The spring 9b thus exerts a preponderant pressure against the pawl 5 over the spring 8b, and this always maintains the pawl in a proper position so that the teeth 5d thereof are in a position to bite against the axle when the latter is introduced to the chuck. These buffers also exert a cushioning effect on the respective clutch pawls, as will presently appear.

Each of the clutch members 2 is held in its packet 1b by a pintle 10 seated in the ribs 1a and spanning the recess 1b. Thus the clutch members may be freely swung with respect to the clutch body 1, either to the open position, illustrated by dotted lines in Fig. 4, or to the closed position, or the clutching position, as illustrated by full lines in Fig. 4. When swung to open position the clutch members 2 are held therein by a locking detent 11, one of which is associated with each of the clutch members 2. The detent 11 is in the form of a flanged pin arranged in a socket 11a, formed in one of the ribs 1a, the detent projecting through the rib into the recess 1b, and into the path of the clutch member 2. A coil spring 11b surrounds the inner end of the detent 11, being disposed in the socket 11a, said spring being seated against a plug 11c is screw-threaded engagement with the rib 1a, and constituting a closure for the socket 11a. The spring 11b serves to project the detent 11 into the path of movement of the clutch member 2, and into engagement with the latter when the same is swung to the open position of the clutch member, thereby maintaining the clutch member in that position until the axle has been introduced to the clutch, whereupon pressure manually applied to the several clutch members will force the latter to their closed or clutching position, at which time the clutch pawls 5 will engage the axle to hold the latter in the chuck.

In use of the herein described chuck the same is applied to the face plate of the lathe. This is designated by the numeral 12, and is illustrated in Fig. 7. The face plate 12 is provided with a plurality of outwardly-extending supporting studs 13, these studs being suitably held in position on the face plate 12. Each of the supporting studs 13 passes through an opening 14, arranged transversely of the chuck body 1, and each of said openings 14 is likewise disposed across a hub or boxing 15 arranged at the face of the body 1 at which the ribs 1a are located. Preferably, there are three of the hubs or boxings 15, and they are arranged in alternate relation with the several pairs of ribs 1a, as clearly seen from Fig. 2. The openings 14 are of larger diameter than the diameters of the supporting studs 13, so as to afford a certain degree of play between the studs 13 and the hubs or boxings 15. This permits the chuck, as a unit, to have a certain degree of movement across the face plate 12, and is for the purpose of compensating for irregularities in the axles when they are introduced to the chuck. The openings 14 intersect, in each of the hubs or boxings 15, a plurality of pockets 16. These pockets are arranged in radial relation to the respective supporting studs 13, and in each of the pockets 16 is located a flanged contact button 17, the several buttons engaging the supporting studs 13. Each of the pockets 16 also contains a coil spring 18, and the outer ends of the several pockets 18 of each of the hubs or boxings 15, save one, are fitted with screw-threaded closure plugs 19, whereby the coil springs 18 are confined within said pockets. The pocket which has no closure plug is closed at its outer end, and thus provides means for confining the coil spring 18 thereof within the pocket. Thus it will be seen that with the several coil springs 18 confined in their several pockets, and the springs exerting pressure on the contact buttons 17 to hold the latter in engagement with the several supporting studs 13, the chuck body 1 is held in yielding relation to the several studs 13, and may move with respect thereto, by reason of the enlarged diameters of the openings 14 over the diameters of the studs 13. The springs 18 yield in the several directions of their length, thus affording a fullness of movement of the chuck with respect to the face plate 12 as may be required to compensate for irregularities in the formation of the axles. In this manner the proper presentation of the axles, during the action of the cutting tools, may be assured.

When the axle has been introduced to the chuck, it is necessary that the clutch members 2 shall exert the proper clutching action on the axle to rotate the same to effect the cutting or turning thereof. The present invention contemplates novel means for effecting this, and for exercising a proper operation of the several clutch pawls 5 to cause the teeth thereof to effect a biting engagement with the axle. To this end a plurality of curved operating links is provided and arranged in interposed relation to the actuating plates 3 of the several clutch members. These links are designated by the numeral 20. The ends of the links are provided with elongated slots 21, each of which receives a guide stud 22, and each of these studs is provided with a binding nut 23 by means of which the operating links 20 are held upon the studs 22. The ends of the links 20 are provided with curved heads which contact with the side edges of the actuator plates 3. By reason of the slots 21 the operating links 20 are capable of sliding movement with respect to the several plates 3, and because of the contact of the curved heads at the ends of the links 20, such sliding movement of the links will effect swinging movement of the actuator plates 3 on their pivotal supports 4. This movement is induced by an operating shaft 24 carried by an anchoring plate 25 suitably secured to one side of the clutch body 1, and squared at its outer end to receive a suitable wrench. A pinion 26 is carried by the operating shaft 24, which pinion meshes with an intermediate idler pinion 27 mounted, as at 28, on one of the operating links 20. This particular link also carries a rack bar 29, the teeth of which are engaged by the teeth of the idler pinion 27. The idler pinion 27 serves to transmit movement from the pinion 26 to the rack bar 29. Thus, when the pinion 26 is actuated by application of a suitable wrench to the operating shaft 24, the link 20 to which the rack bar is connected will be moved in one direction, as, for instance, that indicated by the arrow applied to that link. Thereupon the actuator plate 3, with which the end of the link 20 engages in the direction of movement indicated by the arrow referred to, will be swung upon its pivot 4, and in that movement the clutch pawl 5 carried by that actuator plate will move towards the axle. Simultaneously with that movement the actuator plate 3 in question pushes the next adjacent operating link 20 into contact with the plate 3 next in position of the series, thereby swinging that actuator plate, and in the swinging of the latter the next operating link 20 will be shifted on its supporting studs 22 and moved into contact with the next actuator plate 3 in the series, this movement affording shifting of all of the operating links 20, and a resultant swinging of the several actuator plates 3 simultaneously so as to move the several pawls 5 into engagement with the axle. The teeth or serrations 5d of the pawls thereby are brought into engagement with the axle and bite against the same, so as to firmly grip the axle to effect the turning thereof against the cutting tools.

It will be understood that when the operating shaft 24 has been actuated in the manner above described, in order to swing the several actuator plates 3 and the intermediate link connections 20 to bring about the engagement of the pawls with the axle, the wrench by which the operating shaft 24 has been actuated is removed from that shaft. The lathe then may be set in operation for effecting turning or cutting of the axle.

It will also be understood that in the movement of the actuator plates 3 the several spring buffers 8 and 9 permit a yielding movement between the actuator plates and the pawls 5, as the latter are moved into biting engagement with the axle. This insures a proper contact of the teeth 5d with the axle.

After turning or cutting of the axle has been completed, and it is desired to release the clutch members from engagement therewith, a wrench is again applied to the operating shaft 24, and the shaft thereupon is rotated in a direction opposite to that employed for bringing about the engagement of the clutch members with the axle. This reverses movement of the operating links 20, and this reverse movement of the links 20 also causes a reverse swinging of the actuator plates 3 to that movement which they follow in bringing the clutch members into locking engagement with the axle. Thereupon, the pawls 5 are freed from engagement with the axle, and the latter then may be removed from the chuck.

In the event of the jamming or binding of the axle in relation to the clutch members, so that quick release of the clutch members may not be accomplished, the cam key 7 affords means for releasing the jamming or binding action of the axle in respect to the clutch members. By reference to Figs. 3, 5 and 6, the construction of the cam key and its operation will be seen. This key is provided with a cam shoulder 30. The ends of the key are concentrically mounted with respect to the clutch member 2 which carries the key. This concentric mounting is afforded by one end of the key fitting in the rear portion of the clutch member 2, the opposite end of the key being fitted in a concentric sleeve 31 which is mounted in the front portion of the clutch member 2. Piercing the sleeve 31 is a detent 32 which engages the key 7 so as to maintain the same normally against rotation. The detent 32 is forced into engagement with the key 7 by a coil spring 33 which is housed in the clutch member 2. The construction just described appears in Fig. 3. The cam shoulder 30 of the key 7 is fitted within the bore of the clutch pawl 5 which is associated with the key 7. Normally, the spring buffers 8 and 9 of this particular clutch member hold the pawl 5 in such manner that the pawl will engage with the axle, and become disengaged therefrom, the same as the remaining clutch pawls of the other clutch member. However, should there be a jamming or binding of the axle with the clutch members, the same may be immediately eliminated or released by rotating the cam key 7 so that the cam shoulder 30 thereof, which constitutes an eccentric mounting for the pawl 5 associated with the key, will shift the pawl eccentrically, and thus immediately release the teeth thereof from engagement with the axle. The latter then becomes immediately freed from the other clutch pawls, and its removal from the chuck may then be readily effected.

If desired the annular body 1 may be provided with additional openings 34, interposed between the openings 14, thus to accommodate additional supporting studs carried by the face plate 12, and thereby to afford greater support for the chuck body 1 on the face plate.

It will also be observed that the lips 5c constitute the lobes of a cam structure, so that the pawls 5 are essentially cams in their formation and functioning, their rotation about the pivots upon which they are mounted causing the lips or lobes 5c to act in every respect as cams when engaging the axle.

One end of the cam key 7 is squared for the application of a suitable wrench in order to operate the key. The dotted lines of Fig. 2 illustrate the application of the wrench to the operating shaft 24 and also to the cam key 7.

When the actuator plates 3 are rocked upon their pivots 4, and moved to inclined positions incidental to the movement of the operating links 20, they become locked, thereby also locking the pawls 5 into engagement with the axle, and preventing release of the pawls from that engagement until the actuator plates are rocked in the reverse direction.

I claim:

1. In a chuck of the class described, the combination with a body, of a plurality of clutch members movable to and from clutching relation with the work, yieldable supports for said clutch members, and means for actuating said clutch members independently of their movement to and from clutching relation with the work to engage the members with the work.

2. In a chuck of the class described, the combination with a body, of a plurality of clutch members carried thereby and movable to and from clutching relation with the work, clutch pawls pivotally mounted on said clutch members, yieldable supports for said clutch pawls, and means for actuating said clutch pawls to engage the same with the work.

3. In a chuck of the class described, the combination with a body, of a plurality of clutch members carried thereby and movable to and from clutching relation with the work, clutch pawls pivotally mounted on said clutch members, pawl-actuating means carried by said clutch members to engage the pawls with the work, yieldable connections between the clutch pawls and the pawl-actuating means, and means for operating said pawl-actuating means.

4. In a chuck of the class described, the combination with a body, of a plurality of clutch members pivotally mounted thereon to be swung into and out of clutching relation with the work, yieldable supports for said clutch members, and means for actuating said clutch members independently of their movement to and from clutching relation with the work to engage the members with the work.

5. In a chuck of the class described, the combination with a body, of a plurality of clutch members pivotally mounted thereon to be swung into and out of clutching relation with the work, clutch pawls pivotally mounted on said clutch members, and means for actuating said clutch pawls independently of the movement of the clutch members to and from clutching relation with the work to engage the pawls with the work.

6. In a chuck of the class described, the combination with a body, of a plurality of clutch members pivotally mounted thereon to be swung into and out of clutching relation with the work, clutch pawls pivotally mounted on said clutch members, yieldable supports for said clutch pawls, and means for actuating said clutch pawls independently of the movement of the clutch members to and from clutching relation with the work to engage the pawls with the work.

7. In a chuck of the class described, the combination with a body, of a plurality of clutch members pivotally mounted thereon to be swung into and out of clutching relation with the work, clutch pawls pivotally mounted on said clutch members, pawl-actuating means carried by said clutch members to engage the pawls with the work, and means for operating said pawl-actuating means.

8. In a chuck of the class described, the combination with a body, of a plurality of clutch members pivotally mounted thereon to be swung into and out of clutching relation with the work, clutch pawls pivotally mounted on said clutch members, pawl-actuating means carried by said clutch members to engage the pawls with the work, yieldable connections between the clutch pawls and the pawl-actuating means, and means for operating said pawl-actuating means.

9. In a chuck of the class described, the combination with a body, of a plurality of clutch members carried thereby and movable to and from clutching relation with the work, clutch pawls pivotally mounted on said clutch members, actuating devices pivotally mounted on said clutch members, connections between said actuating devices and said clutch pawls for operating the latter, and means for rocking said actuating devices to effect movement of the clutch pawls into and out of engagement with the work.

10. In a chuck of the class described, the combination with a body, of a plurality of clutch members carried thereby and movable to and from clutching relation with the work, clutch pawls pivotally mounted on said clutch members, actuating devices pivotally mounted on said clutch members, connections between said actuating devices and said clutch pawls for operating the latter, operating links arranged between said actuating devices and movable relatively to the latter to rock the actuating devices on their pivots to effect movement of the clutch pawls into and out of engagement with the work, and means for operating said links.

11. In a chuck of the class described, the combination with a body, of a plurality of clutch members carried thereby and movable to and from clutching relation with the work, clutch pawls pivotally mounted on said clutch members, an actuating plate pivotally mounted on each of said clutch members and operatively related to the clutch pawl of said members, whereby to shift the clutch pawl into and out of engagement with the work, and means for simultaneously operating the actuating plates of the several clutch members.

12. In a chuck of the class described, the combination with a body, of a plurality of clutch members carried thereby and movable to and from clutching relation with the work, clutch pawls pivotally mounted on said clutch members, and actuating plate pivotally mounted on each of said clutch members and operatively related to the clutch pawl of that member, whereby to shift the clutch pawl into and out of engagement with the work, shiftable operating links interposed between the several actuating plates to operate the latter simultaneously, and means for actuating said operating links.

13. In a chuck of the class described, the combination with an annular body, of a plurality of clutch members arranged in radial relation thereto and movable thereon to and from clutching relation with the work, clutch pawls pivotally mounted on said clutch members, an actuating plate pivotally mounted on each of said clutch members and operatively related to the clutch pawl of that member, whereby to shift the clutch pawl into and out of engagement with the work, shiftable operating links interposed between the several actuating plates to operate the latter simultaneously, and means for actuating said operating links.

14. In a chuck of the class described, the combination with an annular body, of a plurality of clutch members arranged in radial relation thereto and pivoted thereon to be swung to and from clutching relation with the work, clutch pawls pivotally mounted on said clutch members, an actuating plate pivotally mounted on the face of each of said clutch members and operatively related to the clutch pawl of that member, whereby to shift the clutch pawl into and out of engagement with the work when said actuating plate is rocked on its pivot, operating links interposed between the several actuating plates and slidably mounted on the chuck body for simultaneously operating said actuating plates, and means for actuating said operating links.

15. In a chuck of the class described, the combination with the face plate of a lathe, of a chuck provided with a plurality of passages therein, a plurality of supporting studs carried by said face plate and loosely received by the passages of the chuck, whereby the chuck may move relatively to said face plate, and cushioning devices interposed between the chuck and the supporting studs.

16. In a chuck of the class described, the combination with the face plate of a lathe, of a chuck provided with a plurality of passages therein, a plurality of supporting studs carried by said face plate and of less diameter than the passages of the chuck, whereby said supporting studs are loosely received by the passages of the chuck to permit movement of the chuck relatively to said face plate, and a plurality of cushioning devices associated with the chuck and arranged in radial relation with respect to each of said supporting studs, whereby to permit yielding movement of the chuck across the face of said face plate.

17. In a chuck of the class described, the combination with a body, of a plurality of laterally-swinging clutch members pivotally mounted at one side of said body for movement to and from clutching relation with the work, clutch pawls pivotally mounted on said clutch members, and means for actuating said clutch pawls independently of the movement of the clutch members, whereby to engage and disengage the pawls with and from the work.

18. In a chuck of the class described, the combination with a body, of a plurality of laterally-swinging clutch members mounted at one side of said body for movement to and from clutching relation with the work, each of said members being pivoted at one of its ends to said body, a clutch pawl pivotally mounted at the other end of each of said clutch members, and means for actuating said clutch pawls independently of the movement of the clutch members, whereby to engage and disengage the pawls with and from the work.

19. In a chuck of the class described, the combination with a body, of a plurality of laterally-swinging clutch members mounted at one side of said body for movement to and from clutching relation with the work, each of said members being pivoted at one of its ends to said body, a clutch pawl pivotally mounted at the other end of each of said clutch members, actuator plates pivotally connected to said clutch members, connections between said actuator plates and said clutch pawls for operating the latter by said actuator plates, and means for actuating the actuator plates to operate the clutch pawls independently of the movement of the clutch members, whereby to engage and disengage the pawls with and from the work.

20. In a chuck of the class described, the combination with a body, of a plurality of laterally-swinging clutch members mounted at one side of said body for movement to and from clutching relation with the work, each of said members being pivoted at one of its ends to said body, a clutch pawl pivotally mounted at the other end of each of said clutch members, actuator plates pivotally connected to said clutch members, connections between said actuator plates and said clutch pawls for operating the latter by said actuator plates, shiftable operating links interposed between the several actuator plates to operate the latter simultaneously, and means for actuating said operating links to operate the clutch pawls independently of the movement of the clutch members, whereby to engage and disengage the pawls with and from the work.

In testimony whereof I have hereunto subscribed my name.

WILLIAM LOWERY.